R. A. SCHULZ.
DOUGH DIVIDER.
APPLICATION FILED JUNE 10, 1911.
1,021,896.
Patented Apr. 2, 1912.
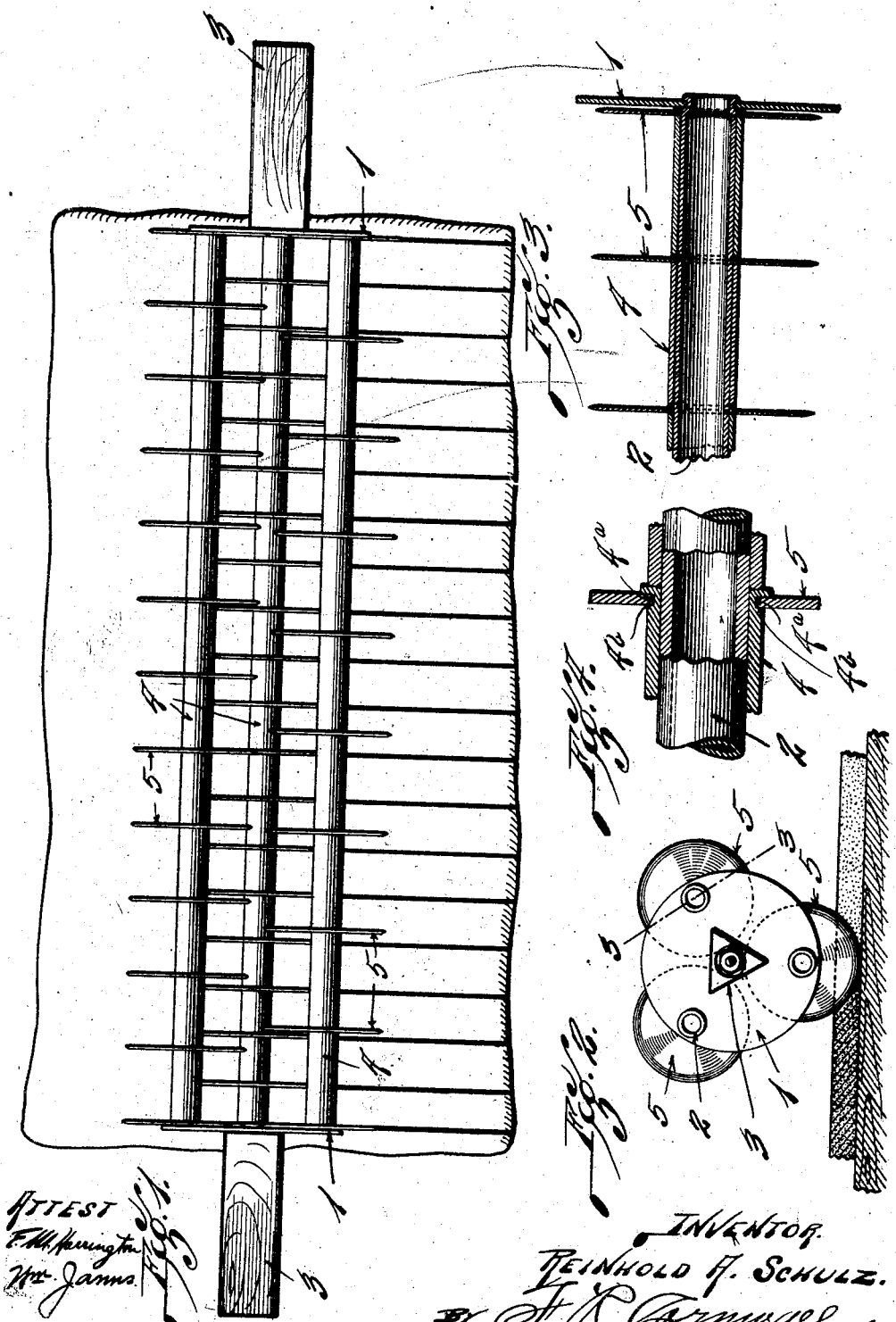

UNITED STATES PATENT OFFICE.

REINHOLD A. SCHULZ, OF ST. LOUIS, MISSOURI.

DOUGH-DIVIDER.

1,021,896.

Specification of Letters Patent.

Patented Apr. 2, 1912.

Application filed June 10, 1911. Serial No. 632,496.

*To all whom it may concern:*

Be it known that I, REINHOLD A. SCHULZ, a citizen of the United States, residing at St. Louis, Missouri, have invented a certain new and useful Improvement in Dough-Dividers, of which the following is a full, clear, and exact description, such as will enable others skilled in the art to which it appertains to make and use the same, reference being had to the accompanying drawings, forming part of this specification, in which—

Figure 1 is a plan view of a dough divider of my improved construction. Fig. 2 is an end elevation of the dough divider. Fig. 3 is an enlarged section taken approximately on the line 3—3 of Fig. 2. Fig. 4 is an enlarged detail section illustrating the manner of attaching the cutting disks to the tubular hubs.

My invention relates to a dough divider particularly intended for bakers' use in dividing or cutting a body of dough of uniform thickness into strips of uniform width, which strips are to be formed into pretzels, snake rolls, cinnamon rolls, and the like.

The object of my invention is to provide a simple implement adapted for hand manipulation, and which comprises a plurality of sets of cutters, which when the device is in use will readily cut a body of rolled out dough into a series of strips of uniform width.

To the above purposes my invention consists in certain novel features of construction and arrangement of parts hereinafter more fully described and claimed.

As shown in the accompanying drawings the frame of my improved dough divider comprises a pair of disks 1, preferably formed of sheet metal, and connecting said disks are tubes 2, the ends of which are rigidly fixed in any suitable manner. These tubes are radially arranged with respect to the centers of the disks 1, and said tubes serve as bearings for the hubs or sleeves carrying the cutting disks hereinafter described. Rigidly fixed in any suitable manner to the center of each disk 1 and projecting outwardly therefrom is a handle 3 which is preferably triangular in cross section in order to be firmly gripped by the hand when the device is in use.

Mounted on each tube 2 is a series of short tubular sleeves 4, which form hubs for the cutting disks 5, which latter are provided with sharp edges 6. These tubular sleeves are mounted to rotate independently upon the tubes 2 and the sleeves of each series or set are uniform in length, and thus the cutting disks 5 of each particular set or series are arranged at uniform distances apart.

The cutting disks of one series are arranged comparatively close together in order to cut strips of dough which are comparatively narrow, and such strips are generally used for making pretzels, or rings and the like. The cutting disks of a second series are spaced farther apart than are the disks of the first series, and this second series of cutters will cut strips of dough of medium width, which strips are generally used for making what are known to the trade as snake rolls. The disks of the third series are spaced farther apart than are the disks of the second series, and thus the disks of the third series will cut comparatively wide strips of dough, which strips are generally used for making what is known to the trade as cinnamon rolls.

Each cutting disk 5 is rigidly fixed upon one of the tubular sleeves 4 by cutting away or turning down one end of the tubular sleeve thereby forming a portion 4ª having an external diameter which is less than the external diameter of the main body portion of said sleeve. Such construction forms a shoulder 4ᵇ and the disk 5 is provided in its center with an opening of such size as to fit snugly on the reduced end of the sleeve. The disk 5 is positioned on the reduced end of the sleeve against the shoulder 4ᵇ and the projecting portion of the reduced end is flanged or riveted outwardly against the outer face of said disk (see Fig. 4).

It will be readily understood that dough dividers of my improved construction can be made in various sizes as desired, and the rotary cutting disks can be spaced apart and made of various sizes as desired.

The use of my improved dough divider is obvious. The body of dough is rolled out to the desired thickness upon a flat surface such as a molding board and the operator now manually engages the handles 3 and the set or series of rotary cutting disks necessary to cut the body of dough into strips of desired width are now rolled over the molding board through the body of dough thereon, thereby cutting the same into strips of uniform width.

A dough divider of my improved construction is comparatively light in weight, can readily be manipulated, can be made in various sizes as desired and provides simple means for cutting or dividing a body of dough into strips of uniform width to be used in making pretzels or rings, snake rolls, cinnamon rolls and the like.

It will be readily understood that minor changes in the form, size and construction of my improved device may be made and substituted for those herein shown and described without departing from the spirit of my invention, the scope of which is set forth in the appended claims.

I claim:

1. The herein-described dough-divider comprising a pair of end plates, a handle fixed to each plate, a series of tubular spindles having their ends seated in said plates, a series of tubular hubs mounted on each spindle, the hubs of one set varying in length with respect to the remaining set and rotary cutting disks fixed to said hubs.

2. In a dough divider of the class described, a series of tubular spindles, a common support for all of the spindles at each end thereof, a series of independent tubular hubs mounted on each spindle, and a cutting disk fixed to each tubular hub.

3. In a dough divider of the class described, a pair of end plates, a handle fixed to each plate, a series of spindles having their ends fixed to the plates, a series of tubular hubs mounted on each spindle and rotary cutting disks carried by said hubs.

In testimony whereof I hereunto affix my signature in the presence of two witnesses, this 7th day of June, 1911.

REINHOLD A. SCHULZ.

Witnesses:
  M. P. SMITH,
  B. S. REID.